July 3, 1962  A. C. KNUDSEN  3,041,867
TESTING APPARATUS FOR BEARINGS
Filed Nov. 28, 1958  3 Sheets-Sheet 1

INVENTOR.
Allan C. Knudsen
BY
ATTORNEY

July 3, 1962

A. C. KNUDSEN 3,041,867

TESTING APPARATUS FOR BEARINGS

Filed Nov. 28, 1958

3 Sheets-Sheet 3

INVENTOR.
Allan C. Knudsen
BY
ATTORNEY

United States Patent Office 3,041,867
Patented July 3, 1962

3,041,867
TESTING APPARATUS FOR BEARINGS
Allan C. Knudsen, Milwaukee, Wis., assignor to General Motors Corporation, Detroit, Mich., a corporation of Delaware
Filed Nov. 28, 1958, Ser. No. 776,910
8 Claims. (Cl. 73—9)

This invention relates to testing apparatus and more particularly to a dynamometer for bearings.

In the design and application of bearings, especially for precision instruments, it is desirable to evaluate the bearing performance under all expected conditions of operation. For example, in gyroscopic instruments the high speed rotor is commonly supported upon a pair of ball bearings that are preloaded to positively establish the axis of rotation and the rotor position along the axis. The bearing preload and the bearing torque are significant parameters in the operation of such bearing assemblies.

In accordance with this invention, there is provided apparatus for simultaneous measurement of bearing torque and bearing preload throughout a wide range of operating conditions such as speed, bearing constraints and inner race alignment with the bearings subjected to various operational environments such as temperature and atmosphere. This is accomplished by mounting the bearings under test in a rotatable bearing holder with one race of each bearing secured to the holder. The other races of the bearings are subjected to the desired constraint by interference sleeves and a predetermined value of preload force is exerted on the races by a strain sensitive shaft which is held against rotation by a torque arm with a strain sensitive section. The entire assembly is disposed within a closed chamber which is subject to both temperature and atmosphere control. For low speed rotation of the bearings, the bearing holder may be driven by an external motor and for high speed rotation, the bearing holder may constitute the rotor of a gyroscope motor and the stator is disposed within the chamber. Strain gage elements on the strain sensitive shaft and on the strain sensitive section of the torque arm are connected in measuring circuit with external instruments for measurement of bearing preload force and bearing torque.

Figure 1:
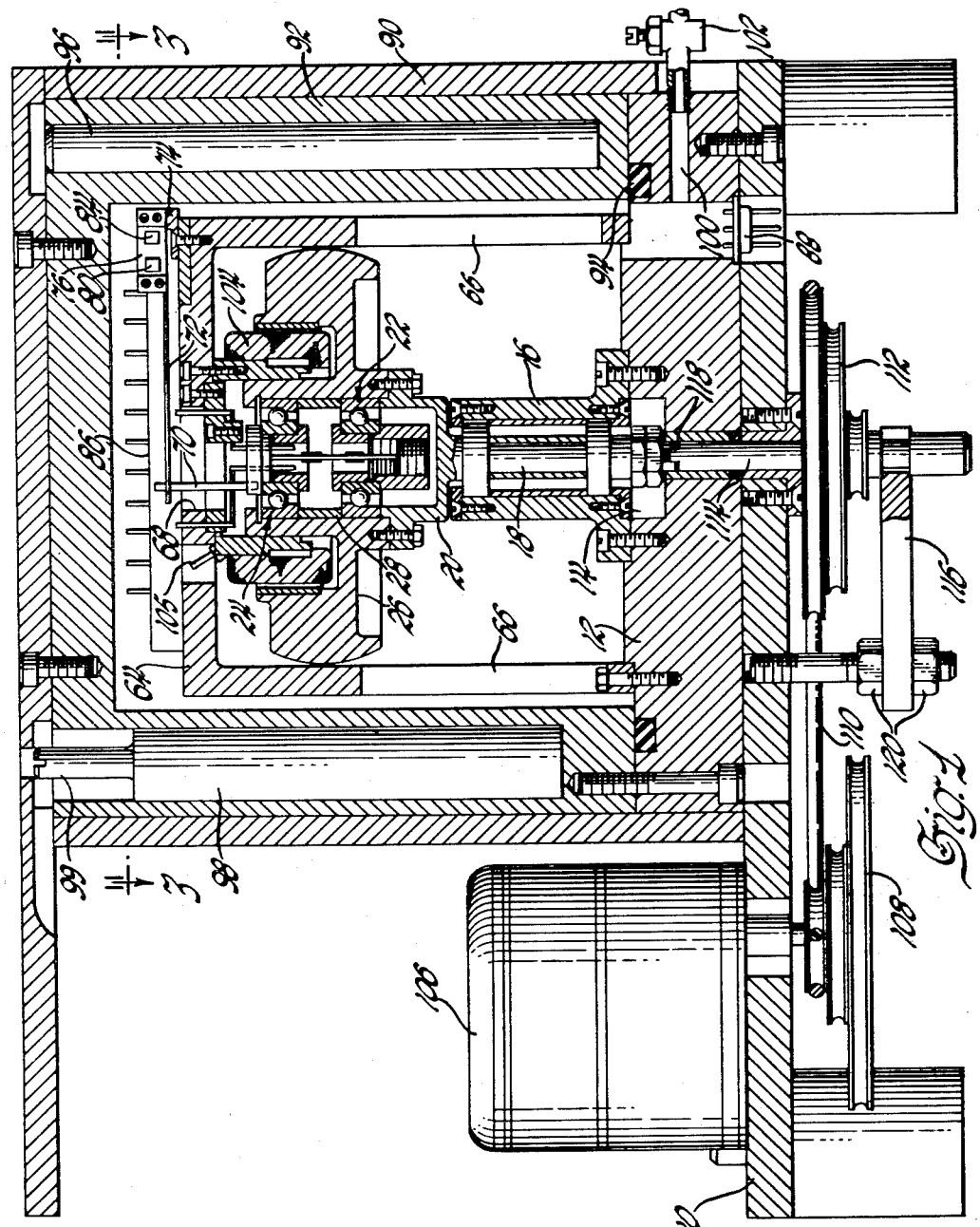
Figure 2:
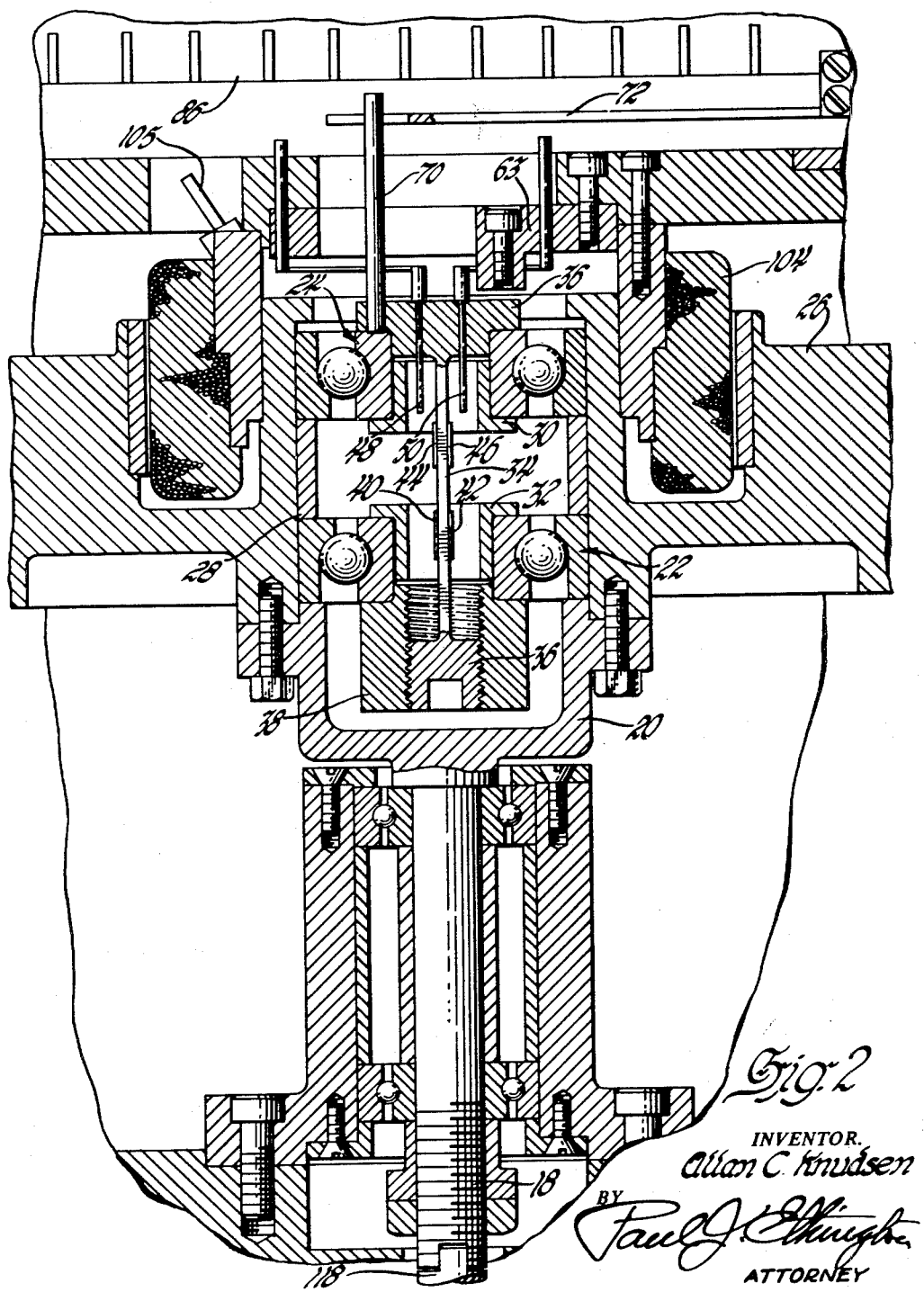
Figures 3, 4:
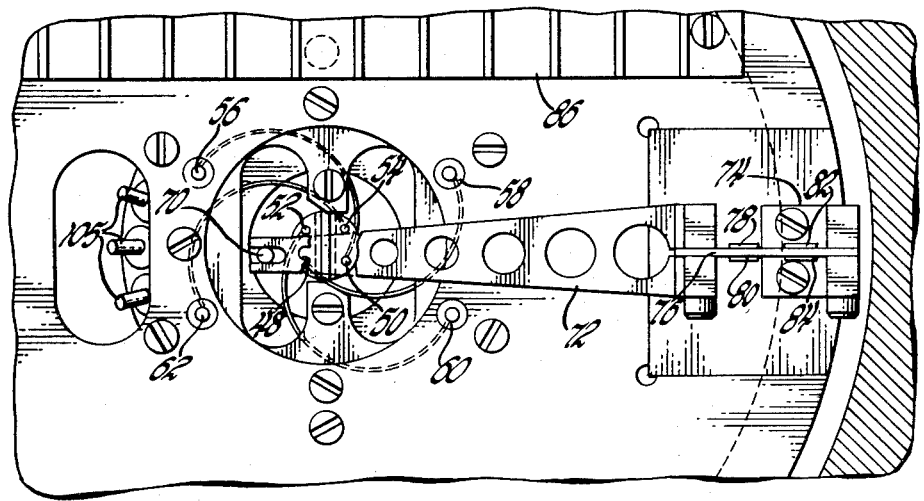

A more complete understanding of the invention may be had from the detailed description which follows taken with the accompanying drawings in which:

FIGURE 1 is a sectional view of the testing apparatus;
FIGURE 2 is an enlarged fragmentary view in section showing details;
FIGURE 3 is a sectional view taken on lines 3—3 of FIGURE 1; and
FIGURE 4 is a schematic diagram of the measuring circuits.

Referring now to the drawings, there is shown an illustrative embodiment of the invention in testing apparatus especially adapted for measuring preload force and torque under various operating conditions of a pair of gyroscope rotor bearings. The apparatus comprises a base 10 upon which is supported a circular plate 12 which defines a central opening terminating in an enlarged recess 14. A hub 16 is secured to the plate 12 over the recess and supports a spindle 18 which terminates in an annular flange 20 at its upper end. A bearing holder which takes the form of a gyroscope rotor 26 is mounted upon the spindle for rotation therewith. The bearings 22 and 24 to be tested are mounted in the hub of the gyroscope rotor by a press fit at the outer races within the hub and are separated by a spacer sleeve 28. The inner races of the bearings 22 and 24 are subjected to a desired amount of bearing constraint by respective interference sleeves 30 and 32 which are press fitted within the inner races. In order to exert a preload force upon the bearings 22 and 24, a strain sensitive shaft 34 having an enlarged head 36 extends coaxially through the inner races with the head seated against the inner race of bearing 24. The base 36 of the shaft 34 receives a nut 38 in threaded engagement. The nut seats against the inner race of bearing 22 and is tightened to subject the bearings to the desired preload value. For measuring the preload variations under operating conditions, strain gage elements 40, 42, 44, and 46 of the resistance type are secured to the strain sensitive shaft 34. The strain gage elements are electrically connected through lead wires 48, 50, 52, 54, which extend through the head 36, and through flexible leads to the binding posts 56, 58, 60, and 62 which are mounted in a ring 63 of insulating material. A cylindrical support member 64 has one end secured to the circular plate 12 and a plurality of windows 66 in its sidewalls. The upper end of the support member 64 defines a large opening 68 surrounded by a plurality of apertures aligned with the binding posts 56, 58, 60, and 62 and the ring 63 is drawn into engagement with the cylindrical support member 64 by a screw.

For measuring the bearing torque, the inner races of the bearings are held against rotation by a stop element or post 70 disposed in the head of the shaft 34 and which is engaged by the forked end of a cantilever beam or torque arm 72 secured by its mounting base 74 to the support member 64. The torque arm 72 includes a thin section 76 to which are secured a set of resistance type strain gage elements 78, 80, 82, and 84 which respond to the bending stress in the arm. An electrical terminal block 86 is mounted on the support member 64 for connection of the strain gage elements to an external circuit through a hermetically sealed connector plug 88 in a passage through the plate 12.

To provide the desired environmental conditions for the bearing test, a cylindrical casing 90 is disposed over the base 12 and includes a liner 92 having an open end hermetically sealed against the base by an O ring 94. The liner 92 also includes a plurality of electrical resistance heater elements 96 which are energized from an external circuit (not shown) through a thermostatic switch cartridge 98 having an actuator 99 for adjusting the value of regulated temperature within the casing 92. The chamber within the casing may be filled with any desired atmosphere, such as helium gas under pressure, or it may be evacuated through a passage 100 in the base 12 and through a valve 102 connected with the external gas pressure source (not shown).

In order to impart high speed rotation to the outer races of the bearings under test, a gyroscope motor stator 104 is mounted upon the support member 64 in alignment with the rotor 26. The stator 104 has energizing terminals 105 which may be connected through the terminal block 86 to the connector plug 88 and thence to an external energizing circuit (not shown). In order to drive the bearings at low speed, an external motor 106 with a drive pulley 108 is mounted upon the base 10 and connected by a belt 110 to a driven pulley 112 on a drive shaft 114 journalled in the base 10 and plate 12. The drive shaft 114 is positioned axially by a thrust support bracket 116 which is connectible with the spindle 18 by a tongue and groove coupling 118. The support bracket is mounted upon the base 10 by a threaded stud and lock nuts 120 to engage the coupling for low speed drive and to disengage the coupling for high speed drive.

The measuring circuits for the bearing preload force and the bearing torque are shown in FIGURE 4. For measuring preload force, the strain gage elements 40, 42, 44, and 46 secured to the strain sensitive shaft 34 are connected in a bridge circuit 122. The gage elements 40 and 42 are connected as active elements which respond to tensile stress and are insensitive to bending stresses and gage elements 44 and 46 are connected as passive temperature compensating elements. The strain gage elements 44 and 42 are connected in one pair of conjugate bridge arms and the elements 40 and 46 are connected in the other pair of conjugate bridge arms. The bridge 122 is excited by an alternating voltage source 124 connected across one diagonal pair of bridge terminals. The signal voltage from the bridge, developed across the other diagonal pair of bridge terminals, corresponds to the instantaneous value of bearing preload force and is applied to a recording and indicating instrument 126.

For measurement of bearing torque, the strain gage elements 78, 80, 82, and 84 are secured to the torque arm 72 in a manner so that all of the elements actively respond to bending stresses therein while affording temperature compensation. The strain gage elements 78 and 80 are connected in one pair of conjugate bridge arms and the strain gage elements 84 and 82 are connected in the other pair of conjugate bridge arms. The bridge circuit 128 is excited by the alternating voltage 124 across one pair of diagonal bridge terminals. The signal voltage taken from the other pair of diagonal terminals corresponds to the instantaneous value of bearing torque and is applied to the recording and indicating instrument 130.

It will now be appreciated that a great variety of environmental and operating conditions may be produced in the testing instrument. The temperature and atmosphere may be established as desired. The bearing constraints may be predetermined by the proper selection of internal interference sleeves and the preload force may be established by the strain sensitive shaft. Interchangeable strain sensitive shafts may be employed to obtain the desired sensitivity of measurement. The strain gages thereon may be connected so as to respond only to tensile strain or may be connected to respond to bending strain. Any desired drive speed may be imparted to the bearings through either the gyroscope stator or the external drive motor.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. Testing apparatus for bearings having inner and outer races with anti-friction elements therebetween, said apparatus comprising a support member, drive transmitting means rotatably mounted in the support member, a bearing holder on said transmitting means and adapted to support a pair of bearings in axial alignment with said transmitting means and drivingly engage one race of each bearing, force exerting means adapted to engage the other race of each bearing for establishing an axially directed preload force on said bearings, stop means secured to said support member and adapted to prevent rotation of the said other race of each bearing, drive means for said transmitting means for imparting rotation to the said one race of each bearing, and force measuring means connected with the force exerting means for measuring preload force variations on said bearings during rotation.

2. Testing apparatus for bearings having inner and outer races with anti-friction elements therebetween, said apparatus comprising a support member, a casing connected with said member and defining a hermetically sealed chamber, a spindle rotatably mounted in the support member and extending into said chamber, a bearing holder on the inner end of the spindle and adapted to support a pair of bearings by one race of each bearing in axial alignment with the spindle, force exerting means adapted to engage the other race of each bearing for establishing the preload on said bearings, stop means secured to said support member and adapted to prevent rotation of the said other race of each bearing, drive means connected with the outer end of said spindle for imparting rotation to the said one race of each bearing, temperature controled electrical heating means disposed in said chamber, means for admitting a desired gas pressure into said chamber, and force measuring means connected with the force exerting means for measuring preload force variations on said bearings during rotation.

3. Testing apparatus for bearings having inner and outer races with anti-friction elements therebetween, said apparatus comprising a support member, a spindle rotatably mounted in the support member, a bearing holder on the spindle and adapted to support a pair of bearings in axial alignment with the spindle and drivingly engage the outer races of the bearings, a strain sensitive shaft adapted to engage the inner races of bearings for establishing an axially directed preload force on said bearings, stop means secured to said support member and engaging said shaft to prevent rotation of the inner races, drive means for said spindle for imparting rotation to the outer races, strain gage elements on the shaft, and a measuring circuit including indicating means connected with the strain gage elements for measuring preload force variations on said bearings during rotation.

4. Testing apparatus for bearings having inner and outer races with anti-friction elements therebeween, said apparatus comprising a support member, a spindle rotatably mounted in the support member, a bearing holder on the spindle and adapted to support a pair of bearings in axial alignment with the spindle and drivingly engage the outer races of the bearings, a strain sensitive member adapted to engage the inner races of bearings for exerting an axially directed preload force on said bearings, torque responsive means secured to said support member and engaging said strain sensitive member to prevent rotation of the inner races, drive means for said spindle for imparting rotation to the outer races, measuring means including an indicating means connected with the torque responsive means for measuring bearing torque during rotation, strain gage elements on the shaft, and a measuring circuit including indicating means connected with the strain gage elements for measuring preload force variations on said bearings during rotation.

5. Testing apparatus for bearings having inner and outer races with anti-friction elements therebetween, said apparatus comprising a support member, a casing connected with the support member and defining a hermetically sealed chamber, a spindle rotatably mounted in the support member within the chamber, an electric motor having its stator mounted on said casing within said chamber and its rotor mounted on the spindle and adapted to support a pair of bearings in axial alignment with the spindle and drivingly engage the outer races of the bearings, a strain sensitive shaft adapted to engage the inner races of bearings for exerting an axially directed preload force on said bearings, stop means secured to said support member and engaging said shaft to prevent rotation of the inner races, strain gage elements on the shaft, and a measuring circuit connecting the strain gage elements to indicating means outside the chamber for measuring preload force variations on said bearings during rotation.

6. Testing apparatus for bearings having inner and outer races with anti-friction elements therebetween, said apparatus comprising a support member, a casing connected with the support member and defining a hermetically sealed chamber, a spindle rotatably mounted in the support member within the chamber, an electric motor having its stator mounted on said casing within said chamber and its rotor mounted on the spindle and adapted to support a pair of bearings in axial alignment with the spindle and drivingly engage the outer races of the bearings, a strain sensitive shaft adapted to engage the inner races of bearings for exerting an axially directed preload force on said bearings, a torque arm secured to said support member and engaging said shaft to prevent rotation of the inner races, said torque arm including a bending strain sensitive section, a first set of strain gage elements mounted on said section, a second set of strain gage elements mounted on the shaft, and a measuring circuit connecting the first and second set of strain gage elements to respective indicating means outside the chamber for measuring the torque and preload force variations on said bearings during rotation.

7. Testing apparatus for a pair of preloaded gyroscope rotor ball bearings, said apparatus comprising a support member, a casing connected with the support member and defining a hermetically sealed chamber, a spindle rotatably mounted in the support member and extending into said chamber, a gyroscope motor rotor mounted on the inner end of said spindle, said rotor including a hub adapted to receive a pair of ball bearings in press-fitted engagement with the outer races of the bearings, a strain sensitive shaft including an enlarged head at one end adapted to engage the inner race of one bearing, a nut in threaded engagement with the other end of the shaft and adapted to engage the inner race of the other bearing for exerting an axially directed preload force on said bearings, a stop element on the enlarged head, means secured to said support member and engaging said stop element to prevent rotation of the inner races, a motor outside said chamber and a drive shaft connected therewith, a coupling for connecting the drive shaft to the spindle for imparting low speed rotation to the outer races, a gyroscope motor stator mounted on the casing within the chamber for imparting high speed rotation to the outer races, strain gage elements on the shaft, and a measuring circuit connecting the strain gage elements to indicating means outside the chamber for measuring preload force variations on said bearings during rotation.

8. Testing apparatus for a pair of preloaded gyroscope rotor ball bearings, said apparatus comprising a support member, a casing connected with the support member and defining a hermetically sealed chamber, a spindle rotatably mounted in the support member and extending into said chamber, a gyroscope motor rotor mounted on the inner end of said spindle, said rotor including a hub adapted to receive a pair of ball bearings in press-fitted engagement with the outer races of the bearings, a strain sensitive shaft including an enlarged head at one end adapted to engage the inner race of one bearing, a first set of strain gage elements on the shaft, a nut in threaded engagement with the other end of the shaft and with the inner race of the other bearing for exerting an axially directed preload force on said bearings, a stop element on the enlarged head, a torque arm secured to said support member and engaging said stop element to prevent rotation of the inner races, a second set of strain gage elements on the torque arm, a motor outside said chamber and a drive shaft connected therewith, a coupling for connecting the drive shaft to the spindle for imparting low speed rotation to the outer races, a gyroscope motor stator mounted on the casing within the chamber for imparting high speed rotation to the outer races, temperature controlled heating means disposed within the chamber, means for admitting a desired gas pressure into said chamber, and a measuring circuit connecting the first and second set of strain gage elements to respective indicating means outside the chamber for measuring the preload force and the torque variations of said bearings during rotation.

References Cited in the file of this patent

UNITED STATES PATENTS

| | | |
|---|---|---|
| 2,471,423 | Gisser | May 31, 1949 |
| 2,531,906 | Christian | Nov. 28, 1950 |
| 2,785,566 | Mims | Mar. 19, 1957 |
| 2,787,905 | Prestipino et al. | Apr. 9, 1957 |
| 2,867,113 | Mims | Jan. 6, 1959 |

FOREIGN PATENTS

| | | |
|---|---|---|
| 893,225 | France | Jan. 24, 1944 |